United States Patent

Willinger et al.

[11] Patent Number: 5,053,125
[45] Date of Patent: * Oct. 1, 1991

[54] FILTER CARTRIDGE

[75] Inventors: Allan H. Willinger, Wright Way; Klaus Woltmann, Demarest, both of N.J.

[73] Assignee: Willinger Bros., Inc., Oakland, N.J.

[*] Notice: The portion of the term of this patent subsequent to Nov. 8, 2005 has been disclaimed.

[21] Appl. No.: 447,386

[22] Filed: Dec. 7, 1989

Related U.S. Application Data

[62] Division of Ser. No. 233,246, Aug. 17, 1988, Pat. No. 4,880,549, which is a division of Ser. No. 871,106, Jun. 5, 1986, Pat. No. 4,783,258.

[51] Int. Cl.⁵ .................... E04H 3/20; A01K 63/04
[52] U.S. Cl. .................... 210/169; 210/484; 210/488; 119/5
[58] Field of Search .................... 210/169, 416.2, 483, 210/484, 488, 492, 460; 119/5

[56] References Cited

U.S. PATENT DOCUMENTS

| | | | |
|---|---|---|---|
| 3,513,978 | 5/1970 | Newstedden | 210/169 |
| 3,525,435 | 8/1970 | Conner | 210/169 |
| 3,558,441 | 6/1969 | Dockery et al. | 210/416.2 |
| 4,036,756 | 6/1977 | Dockery | 210/169 |
| 4,285,813 | 8/1981 | Steward et al. | 210/169 |
| 4,512,885 | 4/1985 | Willinger | 210/416.2 |
| 4,783,258 | 11/1988 | Willinger et al. | 210/169 |
| 4,877,526 | 10/1989 | Johnson et al. | 210/483 |
| 4,880,549 | 11/1989 | Willinger et al. | 210/169 |

FOREIGN PATENT DOCUMENTS

| | | | |
|---|---|---|---|
| 640946 | 12/1936 | Fed. Rep. of Germany | 210/483 |
| 88783 | 1/1937 | Sweden | 210/483 |

Primary Examiner—Peter Hruskoci
Assistant Examiner—Robert James Popovics
Attorney, Agent, or Firm—Helfgott & Karas

[57] ABSTRACT

A filter cartridge comprising a framework and a surrounding envelope of filter material. The framework is reusable and provided with a rough, granular surface texture to provide increase surface area available for the propagation of aerobic bacteria. The envelope is disposable. Thus, biological filtration of the water provided by the aerobic bacteria is not interrupted upon replacement of the filter material. A second filter medium may be disposed within the envelope. The envelope is held in place by a pair of flaps which sandwich an edge of the filter material.

7 Claims, 5 Drawing Sheets

FILTER CARTRIDGE

This is a division, of application Ser. No. 233,246, filed Aug. 17, 1988 which is a division of application Ser. No. 871,106 filed June 5, 1986, now U.S. Pat. Nos. 4,880,549 and 4,783,258 respectively.

BACKGROUND OF THE INVENTION

The invention relates to the field of filters and in particular to the field of aquarium filters and filtering equipment.

In the art of home aquariums, it is known to use a filter system which continuously circulates the water through a filter medium and returns it to the aquarium. One type of aquarium filter system is of the external type and uses a small container mounted on the side of the aquarium which holds the filter medium. The water from the aquarium is drawn through filter material in the container by means of a water pump and then returned to the aquarium. The filter medium is usually in the form of particles of activated carbon or charcoal and a fluffy mass of synthetic resin fibers.

An external type of filter is shown in U.S. Pat. Nos. 3,513,978 to Newsteder and 3,525,435 to Conner.

The Newsteder device uses two separate compartments, each filled with a different filtering substance (i.e., fibrous filtering material and charcoal). The water flows through the fibrous material to the charcoal, through the charcoal and is then returned to the aquarium. In this type of filter, however, the compartment holding the charcoal must have very restricted openings to prevent the flow from washing away any charcoal dust or particles into the aquarium.

The Conner filter uses a perforated top with a depending filter bag that is filled with charcoal. The flow of the water is down through the top, out through the bag walls and returns to the tank. The Conner filter is wholly disposable. However, it allows waste particles to contaminate the charcoal as there is no filtration prior to its passage through the charcoal.

Another type of aquarium filter is the internal or underwater filter. A container is provided which includes a filter medium such as activated carbon or charcoal and a fluffy mass of synthetic resin fibers. An air lift is provided extending from the container and air is pumped down into the air lift from an external air pump. The air pumped into the air tube flows up through the air lift causing a suction to draw water into the container, pass it through the filter medium and up through the air lift along with the air bubbles.

In aquarium filtration, the filter medium provides various types of filtration activity. As the water flows through a porous wall, mechanical filtration of the water occurs with the walls acting as a sieve, retaining the solid contaminants. The activated carbon or charcoal provides a chemical filtration of the contaminated water. At the same time bacteria in the form of accumulated sludge and slime act upon the waste material dissolved in the water, thus providing biological filtration.

The most effective water purification is achieved when bacterial propagation is at a high point. However, at this point prior art filter cartridges usually become subject to clogging and must therefore be removed and replaced. The newly replaced filter cartridge is free of bacteria while the old filter cartridge with bacteria is discarded.

Because the entire filter cartridge is discarded, the filter itself loses the biological filtering effects of microorganisms. These organisms are natural filters because their life functions convert many of the harmful toxic wastes into harmless nitrates. In existing filter cartridges the entire cartridge is sealed and is completely replaced when it becomes clogged. Any bacterial organisms which may have grown within the filter cartridge are therefore discarded with the cartridge itself. This creates a void in filtering ability until the organisms re-establish themselves in the replaced filter cartridge. Additionally, since the filter cartridge is entirely sealed, the amount of carbon particles or other type of filtering material in the cartridge cannot be individually adjusted by the aquarium user himself.

SUMMARY OF THE INVENTION

The filter cartridge of the invention provides a reusable frame which is inserted inside a disposable filter bag or envelope that can be filled with filtration material. The framework is conducive to settlement, growth and propagation growth of micro-organisms. The reuse of the framework without destroying the bacteria provides the filter system with uninterrupted biological filtering action.

The frame is constructed with laterally projecting separators. The separators extend across the filter cartridge. They have a narrow dimension transverse to the flow of the aquarium water thereacross so as to cause only minor constriction of the flow. The separators have a broad dimension parallel to the direction of flow, and serve to space apart the walls of the filter bag in which the frame is contained. The surface of the frame is textured to provide increased available surface area, supporting the growth of organisms active in biological filtration.

The filter cartridge further provides an internal structure for the filter bag or envelope. In this way the water may be circulated through the filtration material from one side of the envelope, through the interior space of the envelope and out the second side. The first wall of the filter envelope filters out large contaminants before reaching the filtration material, such as carbon, which is disposed within the envelope. This prevents clogging and, therefore, early failure of the carbon. The second wall of the envelope prevents carbon dust, which may be picked up by the flow, from being carried out of the filter into the aquarium.

The wall of the filter envelope is comprised of a water permeable filter membrane structure. The membrane is formed of as open web of closely spaced or randomly disposed fibrous or filamentary material which forms a matrix and provides numerous interstices or pores defining water passages. Passage of the water through the interstices in the membrane structure causes mechanical filtration of the water by retaining the solid waste and contaminants.

The roughened, textured, or etched surface of the framework provides a matte finish which increases surface area for the growth of organisms active in biological filtration. This, in combination with the presence of oxygenated water, provides an environment conducive to bacterial propagation. Such aerobic bacteria which propagate cause purification of the contaminated water by acting upon, digesting or converting the toxic materials accumulating in the filter and those dissolved in the water into products which are harmless to aquatic life in the aquarium.

The filter cartridge can be inserted in an external or an internal filter such as a corner or bottom filter. The soft filter envelope covering the rigid or semi-rigid frame creates a better seal along its edges when slid into position in the filter box itself. This eliminates the need for perfect measurements for the sealing area and also prevents breaking or scratching the wall of the filter box.

Additionally, the filter cartridge can be used as a filtering device by itself by causing a flow of the aquarium water through the filter cartridge.

BRIEF DESCRIPTION OF THE DRAWINGS

In the various figures of the drawing, like reference characters designate like parts.

DESCRIPTION OF THE PREFERRED EMBODIMENT

Figure 2:
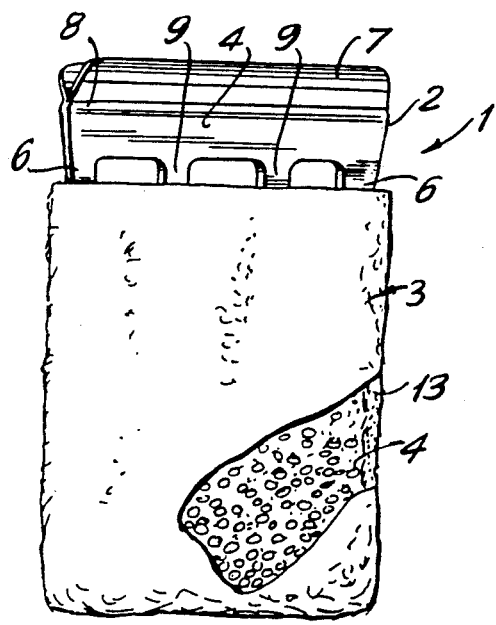
FIG. 2 is a partially broken away front elevational view of the filter cartridge of the invention with the frame partially removed.
Figure 3:
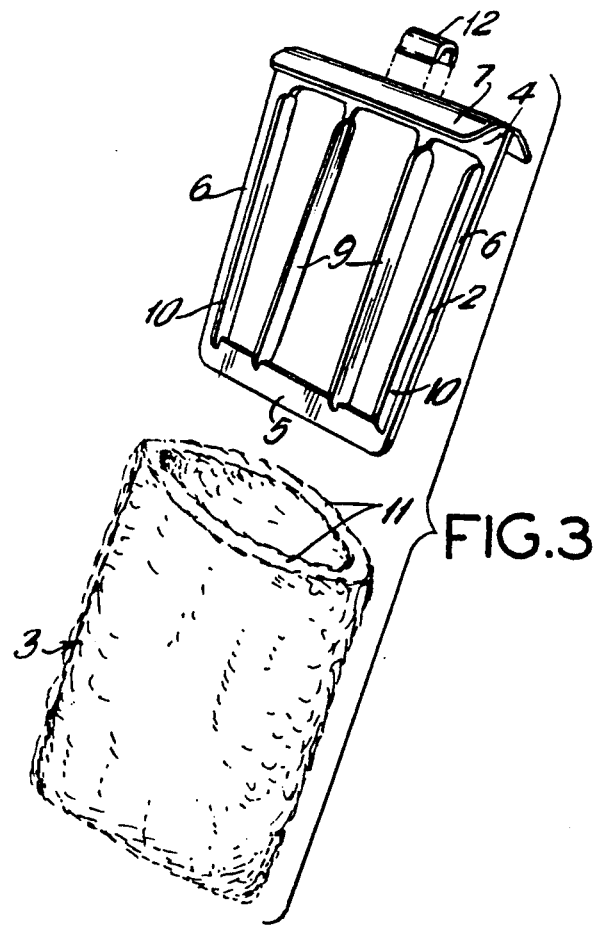
FIG. 3 is an exploded perspective view of the filter cartridge.
Figure 4:
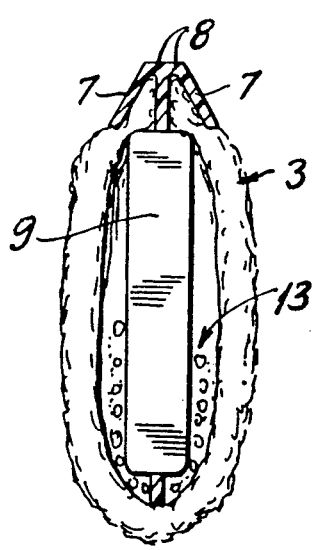
FIG. 4 is a vertical, cross-sectional view of the filter cartridge.

Referring to FIGS. 2, 3 and 4, there is shown the filter cartridge 1 of the invention. The cartridge includes the frame 2 and a filter envelope 3. Charcoal or other filtration material 13 can be placed into the envelope.

Filter envelope 3 is formed of any suitable filter material and may be constructed of synthetic resin fibers in a random or non-woven pattern. The envelope has a front wall and back wall which are joined on three of the four perimeter edges of each.

The frame 2 can be molded plastic. It includes a perimeter defining a frame formed by top portion 4, bottom portion 5 and side portions 6. Two flaps 7 are hingeably attached to the top edge of top portion 4. In the preferred embodiment the flaps 7 are integrally molded with the frame and provided with plastic living hinges 8, that is portions of plastic which are flexible and resist fatigue failure. However, the flaps may be attached in any known manner.

Traversing the interior of the peripheral frame are a plurality of separators 9. The separators extend laterally beyond the front and back of the frame surface in the direction of flow of the water being filtered when the cartridge is in use. In FIGS. 2-5, the separators are shown as vertical flanges which have a narrow thickness in the direction parallel to the top portion 4 and bottom portion 5. This minimizes the surface area which is transverse to the flow of the water being filtered when the cartridge is in use. The separators 9 have a width which is one-half to three-quarters of an inch for an envelope which is about four inches by six inches. The width is measured in a direction perpendicular to the plane of the perimeter defining frame; that is, parallel to the direction of flow when the cartridge is in use. There are similar flanges or separators 10 extending from side portions 6 of the frame.

In use, the frame is positioned within the filter envelope. A second treatment material such as activated carbon or activated charcoal 13 may be added to the envelope and the flaps 7 are folded down, sandwiching the upper edge 11 of the filter envelope 3 between the flap 7 and top portion 4. When the assembled cartridge is inserted into a filter assembly, the flaps will normally be held down. However, optionally, in order to assure that the flaps hold the envelope tightly, a clip 12 can be used. The clip is also useful in preventing the escape of filtering material in shipping the cartridge pre-assembled. The clip is U-shaped and is snapped over the flaps 7 once they have been folded down. The clip biases the flaps toward one another thus holding the envelope. It should be understood that other suitable biasing means may also be used, such as molding the flaps 7 and frame so the flaps are resiliently biased in the sandwiching position.

The separators hold the opposing front and back walls of the envelope in spaced relation. As the water is forced through the filter, it passes first through the front wall, which initially filters the water. It then passes through and is treated by the carbon or charcoal 13 or other filtration material placed in the envelope. Finally, the water flows through the back panel of filter material which causes secondary filtering and prevents the passage of charcoal particles to the aquarium. The two-wall filtering allows freer water flow, as the filter clogs in parts with waste and biological activity.

Figure 1:
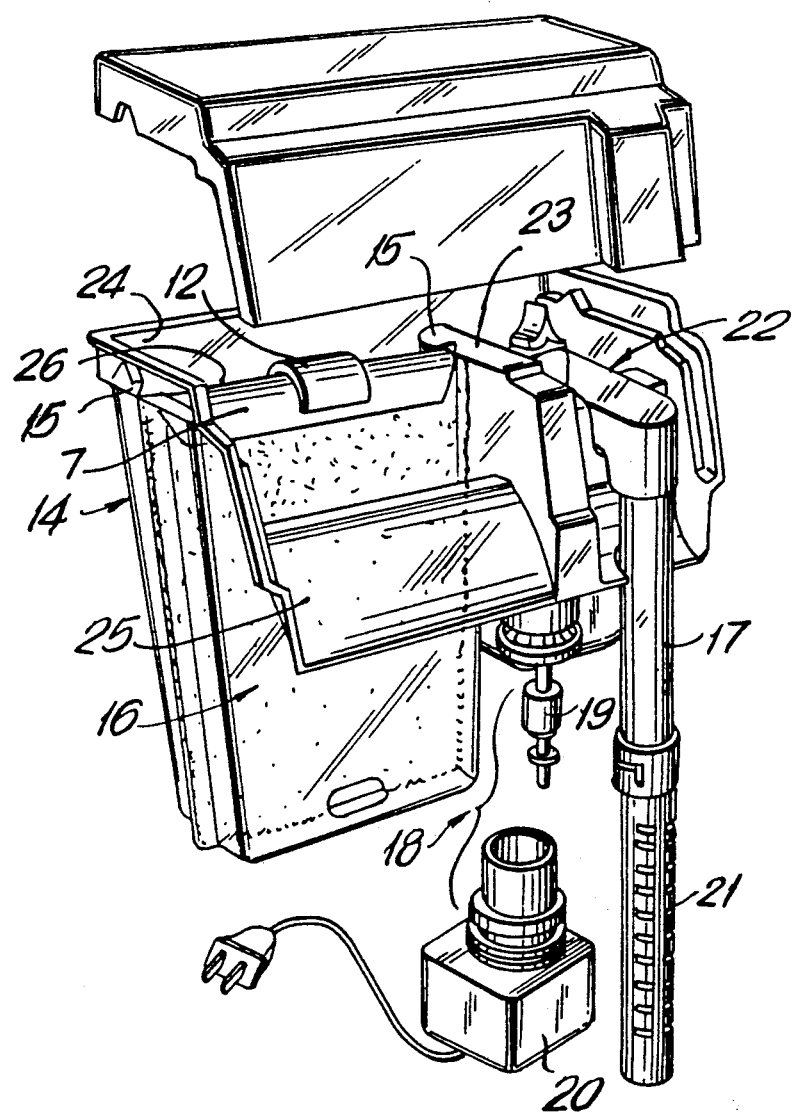
FIG. 1 is a perspective view of an external filter using the filter cartridge of the invention.
Figure 5:
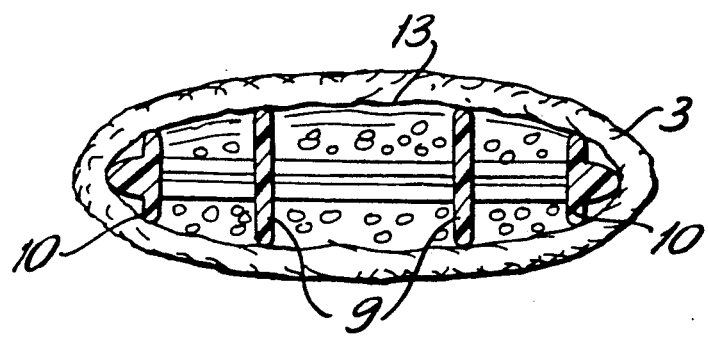
FIG. 5 is a horizontal, cross-sectional view of the filter cartridge.

The filter cartridge can be used in connection with a filter mechanism such as that depicted in FIG. 1. The mechanism is an external filter assembly and has a tank 14 which receives the filter cartridge. The filter cartridge is slideably received in two opposing grooves 15 in the side walls partially defining a clear water chamber 16 in the front and a filtering chamber 26 in the rear. Water from the aquarium is pulled into the filter tank through pipe 17 by a water pump 18. The pump has an impeller 19 and drive motor 20 which are magnetically coupled in any known manner. Pipe 17 has a strainer 21 on the intake end so as to prevent pulling in fish or other objects which may jam or damage the impeller in the pump. The aquarium water is pulled into a receiving chamber 22 which is partially separated from filtering chamber 26 by divider 23. Divider 23 is spaced from back wall 24 of the tank. Water pumped into receiving chamber 22 is allowed to flow into the filter chamber 26 behind the filter cartridge. The rising water level in the filter chamber 26 between the filter cartridge and the back wall and under the force of gravity the water to flow through the interstices in the material of the filter cartridge. The water passing through the filter cartridge wall is mechanically cleaned of contaminants in a sieve-like manner. Once within the filter envelope, the water is further cleansed by the carbon within the envelope and aerobic bacteria which grow on the frame and surfaces of the filter envelope. The water passes through the second wall and is subject to secondary filtration thereby. The water passes through the envelope wall to the clear water chamber 16. As the water level in this chamber rises, it reaches the level of spillway 25 and spills back into the aquarium.

When the filter cartridge becomes clogged with contaminants, it is removed, the envelope, the carbon and other filtration material are discarded and a new envelope positioned on the frame. New carbon and other filtration material is placed within the envelope and the cartridge is replaced in grooves 15 and the filtering process continues.

In addition to mechanical filtration, biological filtration is by far the most important type for removal of toxic waste within an aquarium. In biological filtration, the aquarium water is conditioned as a result of the presence of living organisms, primarily bacteria. The presence of the bacteria serves to convert toxic waste into end products which are not harmful to the aquatic life. The type of bacteria that serve to convert the toxic waste, and especially ammonia, into nitrates which are not harmful, are aerobic bacteria. Aerobic nitrifying bacteria have two basic requirements in order to propagate: high oxygen concentrations and a place to attach themselves. The oxygen is generally provided within the aquarium tank by means of a natural interchange at the surface of the water. The water flowing back into the aquarium from the filter is aerated and brings a fresh supply of oxygen to the aquarium water.

The bacteria adhere in some degree to almost any surface available to them. Such surfaces will naturally include the filter cartridge, especially the frame contained within the cartridge. The frame is especially suited for the growth of bacteria because it is in the path of the constant flow of water laden with dissolved contaminants. Such contaminants include toxic ammonia which serves as the nutrient for the growth of the bacteria. Accordingly, the frame serves as an excellent location for the propagation of organisms which cause biological filtration of the aquarium water.

The propagation of such bacteria increases with time. In fact, a common method of starting biological filtration is to begin with some gravel or some filter material from an established aquarium on which the bacteria have already propagated. Placing such substances having bacteria on it into the aquarium permits the bacteria to propagate as they feed on the waste products in the aquarium.

With prior art filter cartridges, when the cartridge became clogged with contaminants, the entire cartridge was removed. Therefore, any build up of microorganisms useful in biological filtration was thrown away. Insertion of a new, clean filter cartridge which would not have any bacteria present, therefore, would require that the biologic filtration process begin anew on the replaced filter cartridge.

In the present invention, the reusable frame insures the presence of the microorganisms needed for biological filtration. Any build up of such bacteria is retained on the frame itself. The frame can be cleaned in cold water which does not destroy the organisms. Placing the frame into a new envelope retains the organisms previously propagated and permits continued enhancement of the biological filtration process rather than a restarting of the process.

Figure 6:
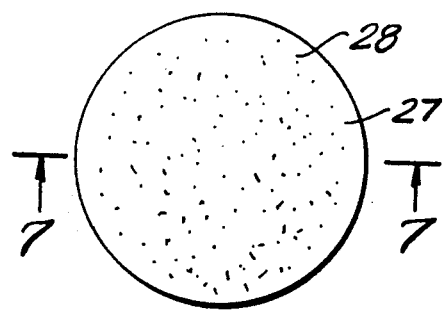
FIG. 6 is an enlarged microview of the textured surface of the frame.
Figure 7:
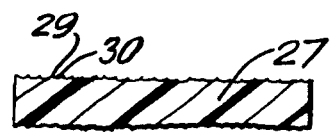
FIG. 7 is a cross-sectional view taken along line 7—7 of FIG. 6.

Since a large surface area provides many more aerobic nitrifying bacteria with a place for attachment the surface of the framework can be etched, sandblasted, or the like, to provide a rough, granular surface texture typically referred to as a matte finish. FIG. 6, shows an enlarged section of the framework 27 which includes the granular surface texture 28. As shown in FIG. 7, the surface includes protrusions 29 and valleys 30 along the surface of the frame. Such protrusions and valleys defining the roughened texture substantially increase the surface area beyond that normally required for structural purposes. However, the bacterial organisms use the protrusions and valleys as adhesion areas on which they can propagate. In this manner, the amount of surface available for the propagation of the organisms is dramatically increased to permit enhancement of the biological filtration provided by the filter.

The frame can be formed by a sandblasting operation in conjunction with a molding process. Either the mold itself can be initially sandblasted in which case each time the frame is molded it will be produced with a rough granular surface. Alternately, a smooth mold can be utilized and the end product frame resulting from the mold can be sandblasted to produce the granular texture on the surface. Another approach would be to etch the rough surface using a chromic acid, or other type of etch material.

The reusable frame assembly provides additional benefits. Existent disposable filter cartridges are completely sealed. They include the exterior envelope which contains charcoal or other filter material. The user never has an opportunity to verify the type of carbon or charcoal utilized or any other type of filtration material that may be in the envelope, and is never certain of the quality or amount of such material present in the filter. With the present invention the user can open the envelope, and verify the presence and type of the activated carbon utilized. In fact, the user can add additional carbon or other water conditioning materials and can select the type that he desires to use. In this way, the filter cartridge can be tailored by the user to the individual needs and requirements of his aquarium. The carbon can also be removed, which is useful in tanks where diseased fish are being treated with medication and where chemical filtration must be stopped while continuing the mechanical and biological filtration.

It should also be appreciated that the present structure provides that the frame is internally of and slidable with respect to the envelope. There is no permanent attachment between the frame and the filter envelope. As a result, there is no wasted portion of the envelope which might be required for attachment to a frame. This allows the envelope to be filled with more material.

Figure 8:
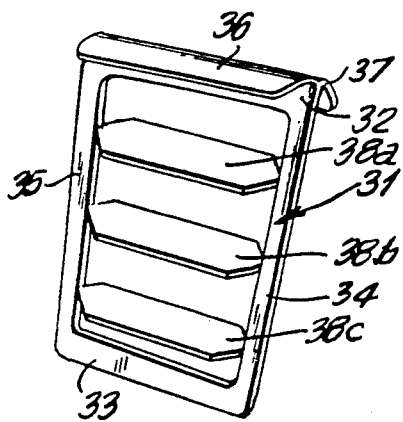
FIG. 8 is a perspective view of a frame, in accordance with another embodiment of the present invention.

The separators traversing the perimeter of the frame need not be only vertical flanges or blades. Other configurations can also be utilized. By way of example, FIG. 8 shows a peripheral frame 31 having a top and bottom wall 32, 33 and opposing side walls 34, 35. Flaps 36, 37 are hingedly connected at the top 32 to close onto the envelope. Three horizontal shelves or trays 38a, 38b, 38c serve as the separators. The trays extend laterally beyond the front and back surface of the frame to provide adequate spacing of the walls of the envelope when the frame is inserted within the envelope.

Using the horizontal trays 38a, 38b, and 38c, there is provided the additional benefit that any charcoal or activated carbon inserted within the envelope will be retained by the trays and will spread the charcoal to various levels within the filter envelope. This will avoid the tendency of the charcoal to settle at the bottom and will instead provide a distribution of the charcoal throughout the height of the filter cartridge.

Figure 9:
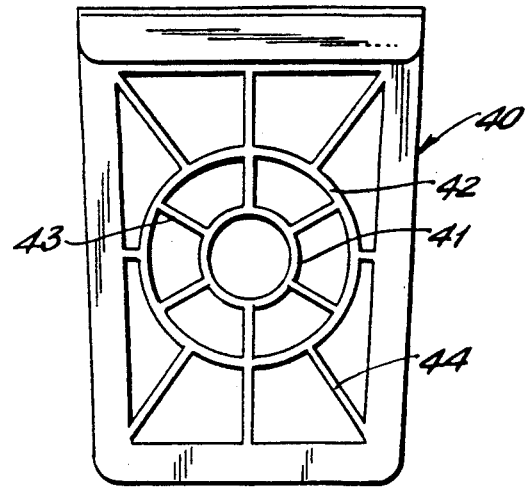
FIG. 9 is a front elevational view of yet another embodiment of the frame.

FIG. 9 shows yet a further arrangement wherein the frame 40 includes a separator arrangement having an inner circle 41 surrounded by a concentric outer circle 42 and connected by a plurality of webs 43 in the form of spokes. The outer circle 42 is spaced from the periphery by means of additional webs 44 also in the form of spokes. With the arrangements shown in FIG. 9 the charcoal will be retained by the spokes and provide a distribution throughout the interior of the envelope.

In all cases, the separators are thin so as not to impede the flow of water through the filter envelope. They also extend laterally forward and behind the frame surface to adequately space apart the walls of the filter envelope.

Figure 10:
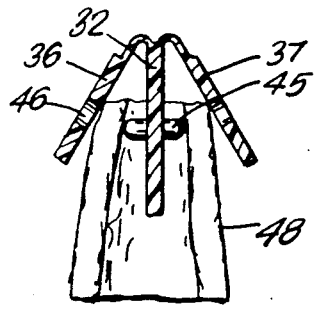
FIG. 10 is an enlarged cross-sectional view of the upper end of the cartridge showing a closure mechanism.

In order to retain closure of the flaps onto the envelope, as shown on FIG. 10, the upper wall 32 of the frame can include a plurality of laterally extending dimples 45. A corresponding plurality of receiving apertures 46 are provided each of the side flaps 36, 37. As the side walls of the envelope 48 are placed between the flaps and the frame, the projecting dimples 45 penetrate into the woven material of the envelope to extend there through. Closure of the flaps onto the dimples permit the apertures 46 to engage the dimples thereby securing the envelope in place. This prevents the envelope from sliding down off the frame work even if it becomes heavy as a result of the weight of the water as well as the presence of the charcoal and any sludge and contaminants that may be retained within the envelope.

Figure 11:
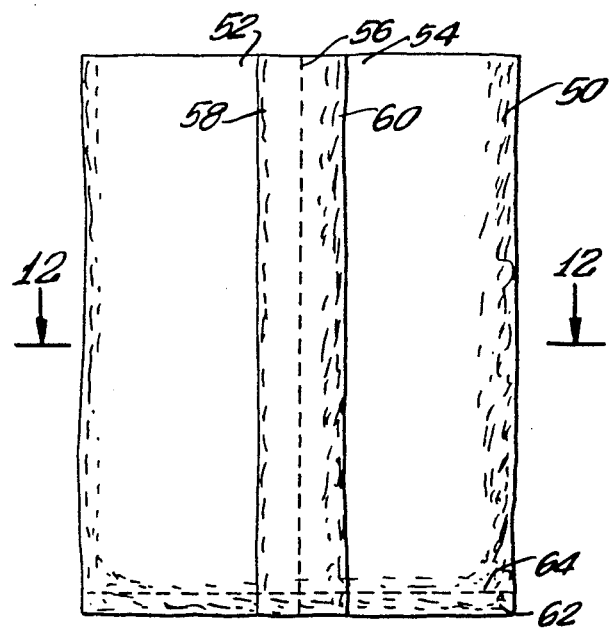
FIG. 11 is a side elevational view of the filter bag showing a method of forming the bag.
Figure 12:
FIG. 12 is a cross-sectional view taken along line 12—12 of FIG. 11.

Preferably the envelope is made of non-woven reticular filter material. As shown in FIGS. 11 & 12, a sheet of such non-woven mat filter material 50 can be formed into a cylinder by wrapping it about its longitudinal axis and stitching the two joining longitudinal ends 52 and 54 together with stitches 56. The edge portions 58 and 60 beyond the stitching 60 mesh together to close the gap formed by the stitches. The meshed portion can than be pressed onto the cylinder 50 so that it overlies the stitched part 56. This gives a doubled over portion at the stitching 56 so there is no loss of thickness at that location. The envelope can then be completed by squeezing the back of the cylinder 50 together and stitching 64 along the bare edge thus formed. In this way the filter envelope can be formed of a single sheet of non-woven material.

As is noted in FIG. 1, the external filter assembly is preferably formed of molded plastic material. In order to extract the molded housing from the mold using an injection molding process, it is noted that the shape of the assembly is downwardly tapered. In a similar manner, the corresponding shape of the frame as shown in FIGS. 3, 8, 9, and others is likewise downwardly tapered to fit into the sideward grooves provided in the filter assembly.

As best noted in FIG. 3, the envelope 3 need not be made with a corresponding tapered shape. The width of the envelope can be made of a size approximately corresponding to the narrow tapered end of the frame. Because of the construction of the bag of non-woven reticulated material, the bag stretches as the frame enters inside the bag. This makes the bag fit tightly onto the frame and causes the bag to grip the frame and provide a snug fit. At the same time, it is not too tight so that it can still be removed for replacement when needed.

As is noted in the drawings, the lateral side edges of the filter cartridge have the envelope as the exterior edge. Since the envelope is formed of a non-woven soft material, as the filter cartridge is inserted into the grooves 15 provided on the side of the filter assembly shown in FIG. 1, the envelope grips the rails within the grooves and gives a tight fit of the filter cartridge within the filter assembly. This prevents leakage of the contaminated water around the sides of the bag and prevents flow of the contaminated water into the clean water chamber.

Figure 13:
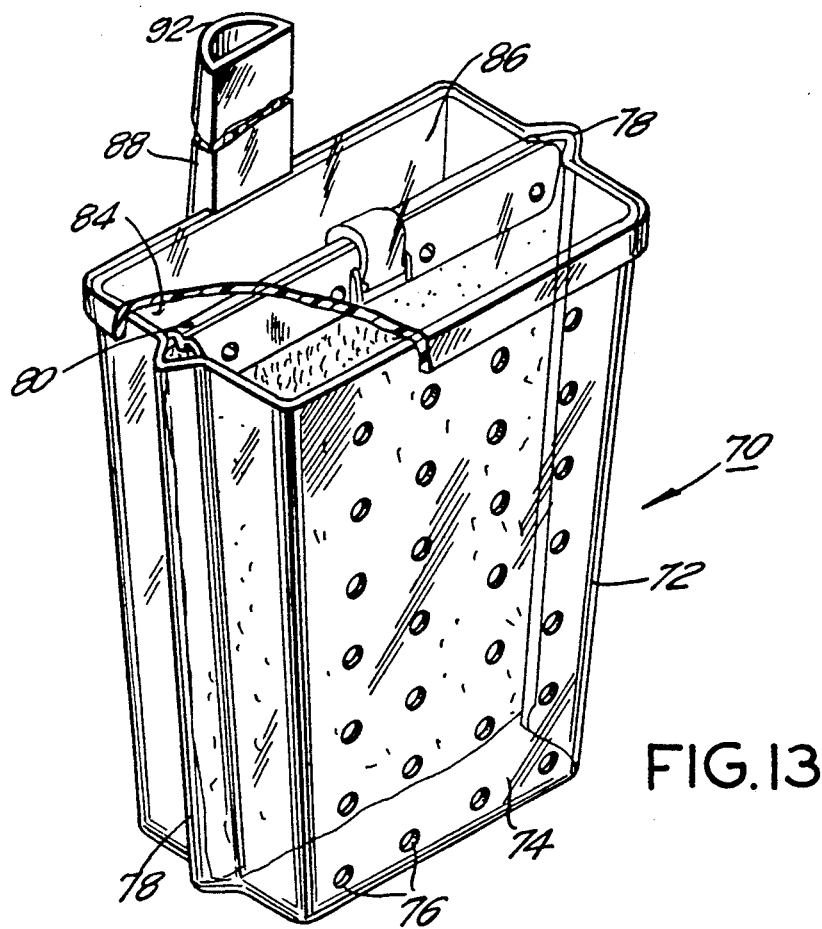
FIG. 13 is a perspective view of an internal, underwater filter assembly using the filter cartridge of the invention.
Figure 14:
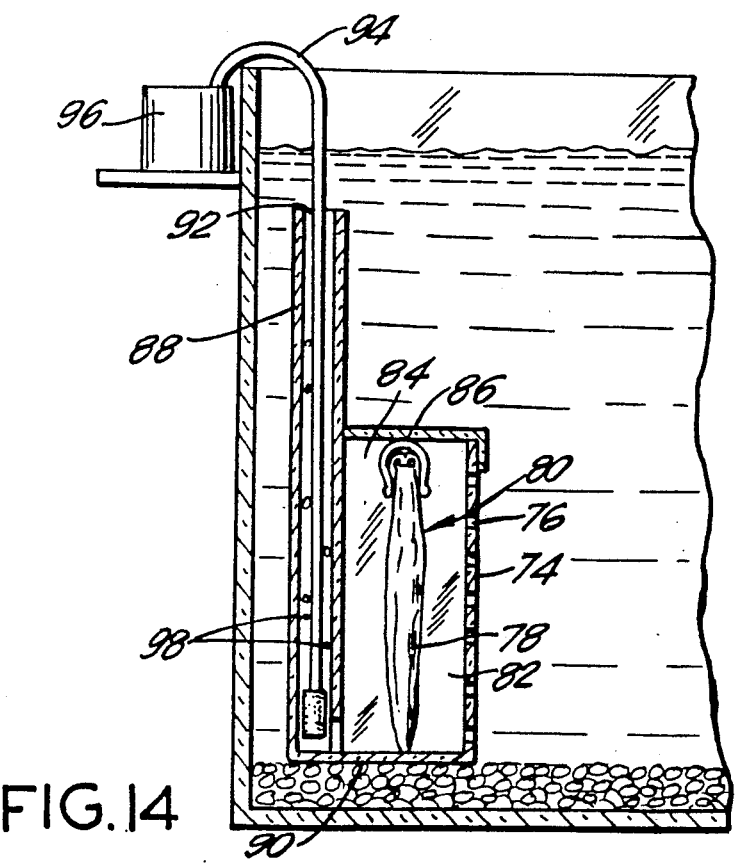
FIG. 14 is a side sectional view showing the use of the filter assembly of FIG. 13 inside the aquarium tank.

The filter cartridge of the present assembly was shown in FIG. 1 for use in an exterior filter assembly which uses a water pump. The cartridge, however, can also be utilized in numerous other types of filter assemblies of various configurations, including the internal or underwater filter, as shown in FIGS. 13–14. By way of example, there is shown an underwater or internal filter 70 including a substantially rectangular tank or housing 72. The housing 72 includes a front wall 74 having a plurality of holes or perforations 76 to permit entry of the water. A pair of side rails or U-shaped channels or grooves 78 and positioned laterally on either side of the housing. The filter cartridge 80 of a type heretofore described in connection with the invention can be slid into the side rails so as to separate a front chamber 82 from a rear chamber 84. The front chamber receives the contaminated water which then passes through the filter cartridge of the invention and then enters into the rear or clear water chamber 84 behind the filter cartridge. A removable cover 86 is provided on the housing 72 to seal the top of the cartridge and permit entry into the housing or tank 72 for removal of the filter cartridge.

Rearward of the housing 72 is formed an air lift tube 88 which can be integral with the housing. A passageway 90 communicates between the clear water chamber 84 and the interior 92 of the air lift tube 88.

An air pipe 94 extends downward into the interior 92 of the air lift tube 88. An air pump 96 serves to pump air through the air pipe into the air lift tube. Typically, an air stone 98 may be placed at the lower end of the air pipe proximate the passageway 90 into the clear water chamber.

During operation, air pumped through the air pipe exits through the air stone at the lower end of the air pipe and travels upwardly through the air lift tube 88. The flow of air upwardly causes a suction drawing the clear water from the clear water chamber 84 along with it upwardly through the air lift tube and back into the aquarium. This flow of the clear water from the clear water chamber 84 causes a suction which brings the contaminated water from the aquarium through the holes 76 in the front wall of the housing to thereby provide a continuous flow through the filter assembly.

As before, it is noted that the housing is slightly downwardly tapered as a result of the injection molding process. Again, the correspondingly shaped taper of the filter cartridge will fit into the housing assembly and the presence of the soft envelope will provide a tight fit into the side grooves 78 in the housing assembly.

Figure 15:
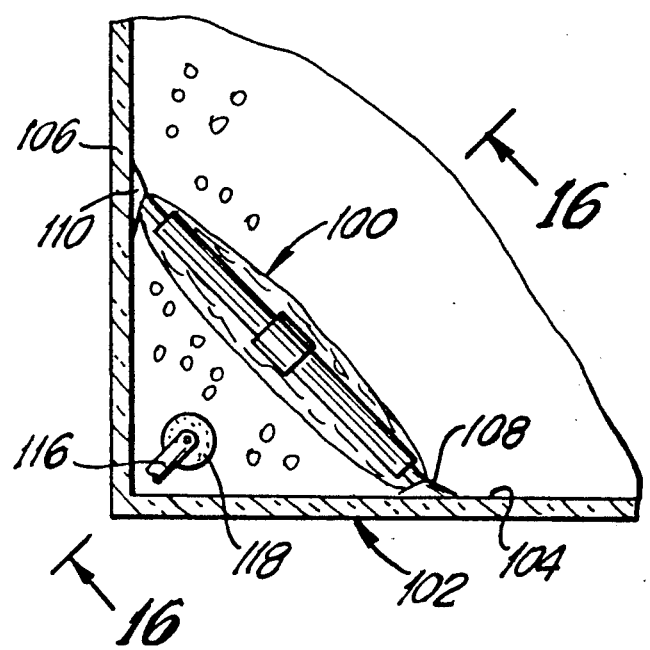
FIG. 15 is a top schematic view showing the use of the filter cartridge itself as a filtering device.
Figure 16:
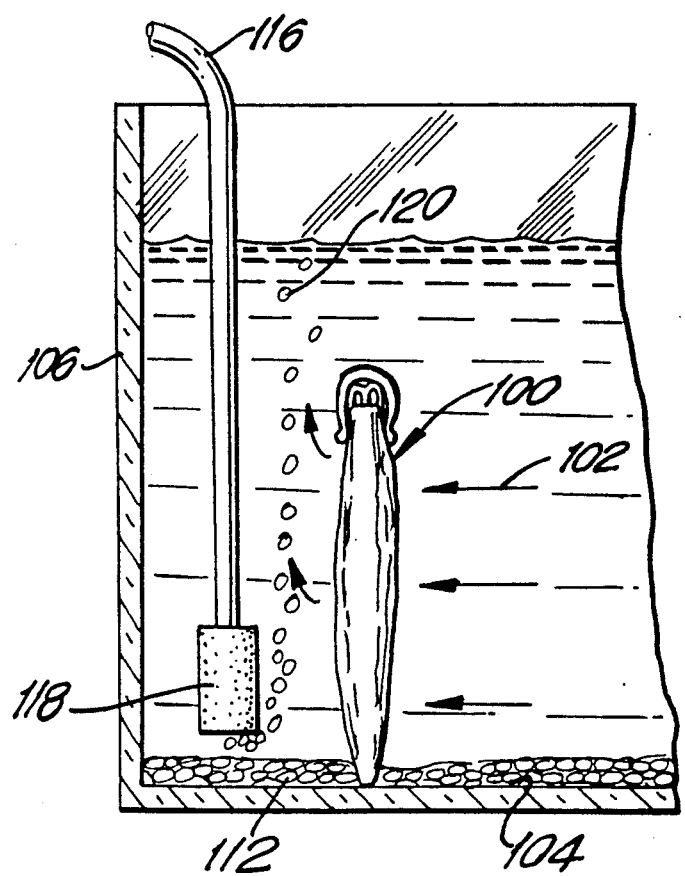
FIG. 16 is a view taken along lines 16—16 of FIG. 15.

Although the use of the filter cartridge has been shown in connection with external filters utilizing water pumps as well as internal filters using air pumps, it will be shown in FIGS. 15 and 16 that the filter cartridge itself can provide an entire filter assembly without an entire filter unit. As shown, the filter cartridge 100 of the present invention is placed vertically across a corner in the aquarium 102 extending diagonally between the corner walls 104 and 106. In order to hold the filter cartridge in place, side suction cups 108, 110 can be connected. Other attachment or securement means could be utilized. In addition, the cartridge could simply be stuck into the gravel 112 provided at the bottom of the aquarium 114. It should be appreciated, that as the filter cartridge gets further clogged it actually sticks tighter and remains more securely in place.

An air tube 116 extends down behind the filter cartridge 100 and an air stone 118 may conveniently be placed at the distal end of the air tube 116. Through the use of an external air pump, air would be pumped through the pipe 116 resulting in a flow of air bubbles 120 from the lower end of the tube or the air stone 118 if it is utilized. The upward flow of bubbles 120 causes a suction behind the filter cartridge 100 to cause the water to flow into the front of the cartridge as shown by the arrows 122. Thus the cartridge by itself can serve as a filter by inserting it into the aquarium and causing a suction behind one wall causing a flow path of the aquarium water through the filter cartridge.

Thus, it is seen that by providing a reusable internal support frame, the filter of the invention continues to increase the biological filtration in the aquarium. The envelope-frame combination also provides an easy maintenance filter with disposable filter material.

We claim:

1. In a combination of a disposable filter envelope of non-woven foraminous material and an aquarium tank filter in which the filter envelope is insertable for filtering the aquarium tank, said envelope having soft pliable edges and opposing walls interconnected at three sides thereof to define a mouth and an inner space, means for positioning said envelope in said aquarium tank filter so that water is circulated through the foraminous material from one side of the envelope, then through said inner space and thereafter out of a second side thereof in a transversal direction of the envelope whereby water is filtered through said foraminous material of both opposing walls.

2. The combination according to claim 1, wherein said walls are connected to each other along a third side thereof to form a bag for receiving therein a framework.

3. In a combination of a disposable filter envelope of non-woven foraminous material and an aquarium tank in which the filter envelope is insertable for filtering the aquarium tank, said envelope having soft pliable edges and opposing walls interconnected at three sides thereof to define a mouth and an inner space so that water is circulated through the foraminous material from one side of the envelope, through said inner space and out of a second side thereof in a transversal direction of the envelope whereby water is filtered through said foraminous material of both opposing walls, and further comprising removably-insertable means for stiffening said envelope provided on said envelope to make said pliable edges rigid.

4. The combination according to claim 3, wherein said stiffening means taper towards a bottom of the envelope.

5. The combination according to claim 3, wherein said stiffening means includes a framework insertable into the envelope through said mouth.

6. In a combination of a disposable envelope with an aquarium filter, the envelope comprising opposing walls of non-woven foraminous filter material, means for interconnecting said walls along two sides thereof and defining a mouth and an inner space between said walls for receiving therein a further filter material so that water may flow through the foraminous filter material of one of said opposing walls, said further filter material and the foraminous filter material of another of said opposing walls in a transversal direction of the envelope and is thus filtered thereby, wherein said envelope comprises a sheet of material wrapped into a cylindrical configuration with opposing longitudinal ends stitched together.

7. The combination according to claim 6, further comprising a framework removably-inserted in said envelope through said mouth.

* * * * *